United States Patent
Bohlmann et al.

(10) Patent No.: US 7,302,678 B2
(45) Date of Patent: Nov. 27, 2007

(54) SYMMETRIC TRANSFORMATION PROCESSING SYSTEM

(75) Inventors: Karsten K. Bohlmann, Walldorf (DE); Andreas Blumenthal, Heidelberg (DE); Stefan O. Bresch, Offenburg (DE); Christian Stork, Boenen (DE); Christoph H. K. Wedler, Heidelberg (DE); Volker Wiechers, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 798 days.

(21) Appl. No.: 10/658,798

(22) Filed: Sep. 10, 2003

(65) Prior Publication Data

US 2005/0055676 A1 Mar. 10, 2005

(51) Int. Cl.
*G06F 9/45* (2006.01)
(52) U.S. Cl. .................. 717/136; 717/144; 715/523
(58) Field of Classification Search ............. 717/144, 717/136; 715/523; 709/246; 707/3
See application file for complete search history.

(56) References Cited

U.S. PATENT DOCUMENTS

| | | | | |
|---|---|---|---|---|
| 6,192,370 B1 * | 2/2001 | Primsch | .................. | 707/103 R |
| 6,397,232 B1 * | 5/2002 | Cheng-Hung et al. | ...... | 715/523 |
| 6,810,429 B1 * | 10/2004 | Walsh et al. | .................. | 709/246 |
| 7,133,862 B2 * | 11/2006 | Hubert et al. | .................. | 707/3 |
| 7,194,733 B2 * | 3/2007 | Ringseth et al. | ............. | 717/136 |
| 7,209,898 B2 * | 4/2007 | Pfeiffer et al. | ................. | 705/51 |
| 7,219,338 B2 * | 5/2007 | Venter | ........................ | 717/140 |

OTHER PUBLICATIONS

XQL: A Query Language for XML Data, W3C.ORG, Hiroshi Ishikawa et al, 1998, 5 pages.*
A Conversion Tool from DTD to XML Schema, W3.ORG, Jan. 11, 2001, 4 pages.*
Document Definition Markup Language (DDML) Specification V 1.0, W3.ORG, Jan. 19, 1999, 44 pages.*
XSLT Working with XML and HTML, Khun Yee Fung, Dec. 28, 2000. Chapters 1,2,3,46,7,12 and 13.*
Template Software Foundation Template. Using the SNAP Language, Chapter 7, 1997.*
JiBX: Binding XML to Java Code; What is JIBX; reprinted from http://jibx.sourceforge.net/ printed on Mar. 3, 2004 (1 page).
JiBX: Flexibility with JiBX; Flexibility, reprinted from http://jibx.sourceforge.net/flexibility.html printed on Mar. 3, 2004 (1 page).
JiBX: Performance with JiBX; Performance; reprinted from http://jibx.sourceforge.net/performance.html printed Mar. 3, 2004 (2 pages).

(Continued)

*Primary Examiner*—Todd Ingberg
(74) *Attorney, Agent, or Firm*—Fish & Richardson P.C.

(57) ABSTRACT

An application system includes a first process configured to execute an application program, wherein the application program is operable to use a set of data structures. The application system also includes a second process configured to interpret a markup language document. A transformation template is configured to specify a symmetric mapping between the markup language document and the set of data structures. A transformation virtual machine runs in association with the first process and is operable to execute the transformation template. The transformation virtual machine is operable to perform a symmetric transformation between the markup language document and the set of data structures to allow the first process and the second process to exchange information.

50 Claims, 3 Drawing Sheets

OTHER PUBLICATIONS

JiBX: Clean Code with JiBX; Clean code; reprinted from http://jibx.sourceforge.net/clean-code.html printed on Mar. 3, 2004 (1 page).

JiBX: Usage; Getting started with JiBX; reprinted from http://jibx.sourceforge.net/usage.html printed on Mar. 3, 2004 (1 page).

JiBX: Bindings Tutorial; reprinted from http://hibx.sourceforge.net/binding-tutorial.html printed on Mar. 3, 2004 (3 pages).

A basis binding; Getting Started; reprinted from http://jibx.sourcegorge.net/binding-start.html printed Mar. 3, 2004 (3 pages).

Going further with bindings; Variations on a theme; reprinted from http://jibx.sourceforge.net/binding-extras.html printed on Mar. 3, 2004 (3 pages).

Working with collections and IDs; Working with collections; reprinted from http://jibx.sourceforge.net/binding-collects.html printed on Mar. 3, 2004 (3 pages).

Structure mapping between XML and Java; Structure mapping; reprinted from http://jibx.sourceforge.net/binding-structures.html printed on Mar. 3, 2004 (4 pages).

Advanced binding features; Working with namespaces; reprinted from http://jibx.sourceforge.net/binding-advanced.html printed on Mar. 3, 2004 (3 pages).

Method hooks for extending JiBX; User extension method hooks; reprinted from http://jibx.sourceforge.net/binding-extend.html printed on Mar. 3, 2004 (4 pages).

Customizing JiBX binding behavior; Using custom code with JiBX; http://jibx.sourceforge.net/binding-custom.html printed on Mar. 3, 2004 (6 pages).

Using the Binding Compiler; Running the compiler directly; reprinted from http://jibx.sourceforge.net/bindcomp.html printed on Mar. 3, 2004 (2 pages).

Runtime usage; Runtime; reprinted from http://jibx.sourceforge.net/runtime.html printed on Mar. 3, 2004 (2 pages).

Helper Tools; JiBX extras; reprinted from http://jibx.sourceforge.net/tools.html printed on Mar. 3, 2004 (2 pages).

JiBX: JiBX Binding Definition; Binding Definition Overview; reprinted from http://jibx.sourceforge.net/binding-overview.html printed on Mar. 3, 2004 (1 page).

JiBX: Nesting and Contexts; Nesting and Context; reprinted from http://jibx.sourceforge.net/context.html printed on Mar. 3, 2004.

JiBX: Value Conversions; Value Conversions; reprinted from http://jibx.sourceforge.net/conversions.html printed on Mar. 3, 2004 (2 pages).

JiBX: Definition XML Summary; Element Summary; reprinted from http://jibx.sourceforge.net/xml-summary.html printed on Mar. 3, 2004 (2 pages).

JiBX: <binding> Element; <binding> Element Definition; reprinted from http://jibx.sourceforge.net/binding-element.html printed Mar. 3, 2004 (1 page).

JiBX: <format> Element; <format> Element Definition; reprinted from http://jibx.sourceforge.net/format-element.html printed Mar. 3, 2004 (1 page).

JiBX: <namespace> Element; <namespace> Element Definition; http://jibx.sourceforge.net/namesapce-element.html printed on Mar. 3, 2004 (1 page).

JiBX: <mapping> Element; <mapping> Element Definition; http://jibx.sourceforge.net/mapping-element.html; printed on Mar. 3, 2004 (2 pages).

JiBX: <value> Element; <value> Element Definition; http://jibx.sourceforge.net/value-element.html printed on Mar. 3, 2004 (2 pages).

JiBX: <structure> Element; <structure> Element Definition; reprinted from http://jibx.sourceforge.net/structure-element.html printed on Mar. 3, 2004 (2 pages).

JiBX: <collection> Element; <collection> Element Definition; reprinted from http://jibx.sourceforge.net/collection-element.html printed on Mar. 3, 2004 (2 pages).

JiBX: Attribute Groups; Attribute Groups; reprinted from http://jibx.sourceforge.net/binding-attributes.html printed on Mar. 3, 2004 (3 pages).

Ort et al., Java Architecture for XML Binding (JAXB); reprinted from http://java.sun.com/developer/technicalArticles/WebServices/jaxb/ printed on Mar. 3, 2004 (13 pages).

T. Lin; Architecture for XML Binding (JAXB): A Primer; reprinted from http://java.sun.com/developer/technicalArticles/xml/jaxb/ printed on Mar. 3, 2004 (5 pages).

* cited by examiner

```
<tt:transform version="0.1"                                               302
  xmlns:tt="http://www.sap.com/transformation-templates"                  302
  xmlns:p1="U1">                                                          302
>                                                                         302
<!-- *********************************************************            398
  SAP Simple Transformations sample program, demonstrates                 398
  most ST instructions                                                    398
  Copyright (c) 2003, SAP AG, Germany. All rights reserved.               398
  ********************************************************* -->           398

<tt:include name="include.xtt"/>                                          304

<tt:root name="R1"/>                                                      306
<tt:root name="R2"/>                                                      308

<tt:template>                                                             310
                                          400
  <x0>                                                                    312
  <!-- literal element with literal attributes -->                         398
    <x1 a11="v11" a12="v12">                                              314
  <!-- ref-node value -->                                                  398
      <tt:value ref="R1.C1"/>                                             316
    </x1>                                                                 318

<!-- element with ref-node value -->                                     398
    <x2 tt:value-ref="R1.C2"/>                                            320

<!-- element with literal value and lax matching -->                     398
    <x3 tt:lax="y"><tt:text> text3</tt:text></x3>                         322

<!-- element in namespace -->                                            398
    <p1:x4 xmlns:p2="U2" tt:ref="R2.C1"/>                                 324
  <!-- attribute with ref-node value -->                                   398
      <tt:attribute name="a41" value-ref="".R1.C3"/>                      326
  <!-- attribute with complex content -->                                  398
      <tt:attribute name="p2:a42" ref="".R1.C4">                          328
        <tt:text>text42</tt:text>                                         330
      </tt:attribute>                                                     332
  <!-- empty element -->                                                   398
      <x41/>                                                              334
  <!-- value with follow-text -->                                          398
      <tt:value/>                                                         336
      <tt:text>text4</tt:text>                                            398
    </p1:x4>
```

```
  <!-- value with special mappings -->                                     398
    <tt:value ref="R2.C2"                                                 346
      map=" s('~','+','-'), d('*','-')  "/>                               398

<!-- copy of sub-tree -->                                                398
    <tt:copy ref="R2.C3"/>                                                348

<!-- loop over table -->                                                 398
    <tt:loop ref="R2.C4"><x5 tt:value-ref="IC1"/></tt:loop>               350

<!-- skip elements -->                                                   398
    <tt:skip name="p1:x6" count="*"/>                                     350

<!-- call -->                                                            398
    <tt:call transformation="ST1">                                        352
      <tt:with-root name="RR1" ref="R2.C5"/>                              354
    </tt:call>                                                            356

<!-- basic conditional with assertion -->                                398
    <tt:cond data="equal('R2.C7',42)">                                    358
      <x7 tt:value-ref="R2.C8"/>                                          360
    </tt:cond>                                                            362

<!-- switch -->                                                          398
    <x8 tt:ref="R1">                                                      364
      <tt:switch>                                                         366
        <tt:cond data="initial(C5)">                                      368
          <tt:attribute name="nil">true</tt:attribute>                    370
        </tt:cond>                                                        372
        <tt:s-cond data="check(less(C5,100))">99</tt:s-cond>              374
        <tt:cond data="check(less-equal(C5,200) and                       376
          (not(type-I(C4)) or greater-ref(C5,C4)))">                      376
          <tt:value ref="C5"/>                                            378
        </tt:cond>                                                        380
        <tt:d-cond data="equal(C5,100)">                                  382
          <tt:empty/>                                                     384
        </tt:d-cond>                                                      386
      </tt:switch>                                                        388
    </x8>                                                                 390

</x0>                                                                   392

</tt:template>                                                            394

</tt:transform>                                                           396
```

*Fig. 3* ⬋ 300

SYMMETRIC TRANSFORMATION PROCESSING SYSTEM

CROSS-REFERENCE TO RELATED APPLICATION

This application is related to U.S. Provisional Application No. 60/501,401, filed Sep. 10, 2003 and titled SYMMETRIC TRANSFORMATION PROCESSING SYSTEM, which is hereby incorporated by reference in its entirety for all purposes.

TECHNICAL FIELD

This invention relates to a programming language for transformations between data structures of an application programming language and markup language source code such as XML documents.

BACKGROUND

Different machines may run different operating systems and applications written in different programming languages, which prevents direct communication. An application cannot use information directly from another application running on a different platform. The information must be transformed into a form that can be understood by both applications. Extensible Markup Language (XML) documents are increasingly used as such a platform-neutral data communication format. This brings about the requirement for transformations between XML and platform-specific data structures.

SUMMARY

In one general aspect, transforming application data structures into an XML document includes writing an application having data structures and writing a transformation program. This process also includes executing the application program. During its execution, the application program calls for execution of the transformation program to transform the data structures from the application program into an XML document that is sent to a recipient.

Implementations may include one or more of the follow features. The transformation program may be executed on a dedicated virtual machine. This virtual machine may run on a web application server.

The transformation program may be compiled into a byte-code language. This compiled program may then be executed on a dedicated virtual machine. The transformation program may be written in a markup language syntax.

The transformation program also may include a construct for reading a value within the data structures and writing the value to the XML document. The transformation program also may allow for literal XML elements, attributes, and text that appear within the transformation program to be written to the XML document. The transformation program may include a construct for specifying attributes to be written to the XML document. The transformation program also may include a construct for declaring namespaces in the XML document.

The transformation program may include a construct for skipping program instructions. The transformation program also may include a construct for copying elements from the data structures to the XML document. The transformation program also may include a construct for calling another transformation program. The transformation program also may include a construct for applying a transformation template associated with another transformation program called by the application program.

The transformation program also may include a construct for looping over data structures while creating the XML document. The transformation program also may include a construct for executing conditional logic to create certain XML content within the XML document.

The transformation program used to convert the data structures into the XML document may be used to convert the XML document back into data structures.

In another general aspect, transforming an XML document into application data structures includes writing an application program configured to use data structures and writing a transformation program. This process also includes executing the application program. During its execution, the application program may call for execution of the transformation program to transform an XML document into data structures for the application program. Transforming an XML document into application data structures also includes using the data structures.

Implementations may include one or more of the following features. The transformation program may be executed on a dedicated virtual machine. This virtual machine may run on a web application server.

The transformation program may be compiled into a byte-code language. This compiled program may then be executed on a dedicated virtual machine. The transformation program may be written in a markup language syntax.

The transformation program also may include a construct for reading a value within the XML document and writing the value to the data structures. The transformation program also may include literal XML elements that are matched in the XML document. The transformation program also may include a construct for matching the name of an attribute in the XML document. The transformation program also may include a construct for matching a namespace declaration in the XML document.

The transformation program may include a construct for skipping program instructions. The transformation program also may include a construct for copying elements to the data structures from the XML document. The transformation program may also include a construct for calling another transformation program. The transformation program also may include a construct for applying a transformation template associated with another transformation program called by the application program.

The transformation program also may include a construct for looping over content from the XML document while creating the data structures. The transformation program also may include a construct for executing conditional logic to create certain data structures.

The transformation program used to convert the XML document into data structures may be used to convert the data structures back into the XML document.

In another general aspect, an application system includes a first process configured to execute an application program, where the application program is operable to use a set of data structures. A second process is configured to interpret a markup language document. A transformation template is configured to specify a symmetric mapping between the markup language document and the set of data structures. A virtual machine run in association with the first process and operable to execute the transformation template. The transformation virtual machine is operable to perform a symmetric transformation between the markup language document and the set of data structures to allow the first process and the second process to exchange information.

Implementations may include one or more of the following features. The first process may be an ABAP virtual machine running on an application server. The second process may be one of a client processor and a server processor configured to communicate with the application server.

The application system also may include a database configured to communicate with the application server, where the database is operable to store at lease one of XML data and non-XML data. The application server may be a web application server.

The details of one or more implementations are set forth in the accompanying drawings and the description below. Other features, objects, and advantages will be apparent from the description and drawings, and from the claims.

DESCRIPTION OF DRAWINGS

FIG. 3 is an illustration of an example program written in the simple transformations language Like reference symbols in the various drawings indicate like elements.

DETAILED DESCRIPTION

Figure 1:
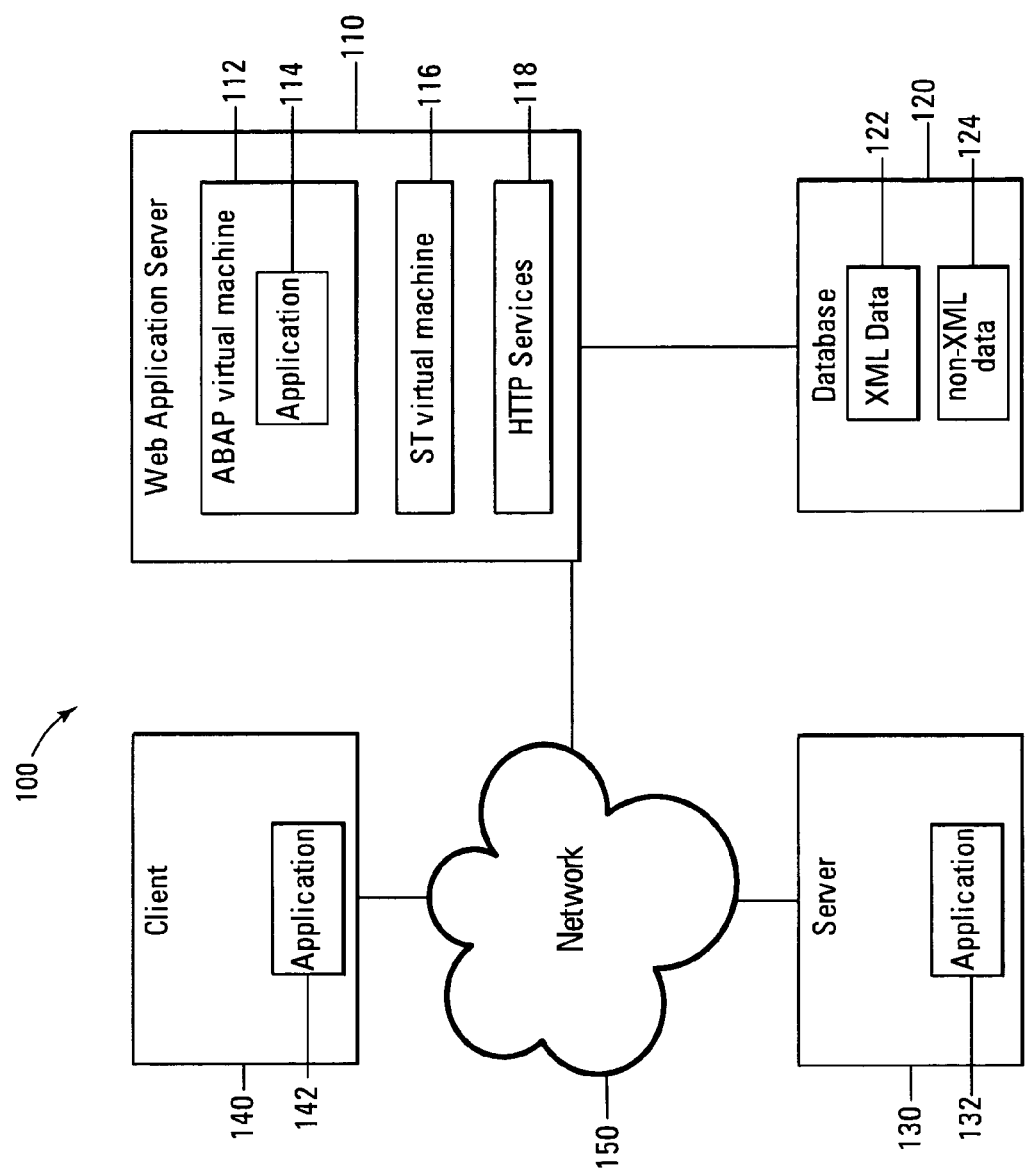
FIG. 1 is a block diagram of an enterprise application system operable to support and process the simple transformations language.

A declarative programming language for specifying transformations between data structures of an application programming language and Extensible Markup Language (XML) documents, called simple transformations (ST), is described. XML documents are platform-independent text files that can be read by any application that has access to a standard XML parser. XML documents are a simple means of representing structured information for use by a wide variety of applications and transferring those documents between those applications. However, those applications cannot use the XML documents directly. They can use basic XML tools, such as the XML parser, to process the XML documents, but this is a very low level of programming. ST is a way to replace this raw XML processing with a high-level transformation language that allows for the specification and execution of the transformation from XML to data structures that can be used by the applications.

Likewise, information must also be shared between applications, but application data structures cannot in every case be passed between and used by different applications. XML documents are a communications medium that all applications can understand. Applications can format the information that it wishes to share using XML, making it understandable by other applications. Simple transformations also allows for the specification and execution of the transformation from application data structures to XML documents that can be shared among different applications.

In fact, sharing information between applications involves both conversion from application data structures to XML documents, a process called serialization, and conversion from XML documents to application data structures, a process called deserialization. First the data structures from one application must be serialized into an XML document that can be sent to another application. That application must then deserialize the XML document it received into data structures that it can then use. In this case, serialization and deserialization are exact inverses of each other.

The class of transformations expressible in the ST programming language encompasses arbitrary combinations of the following operations: renamings, permutations, projections, constants, defaults, conditionals, loops, and value conversions. This restricted functionality suffices for a high percentage of transformations in practice. ST programs use XML syntax. The structure of an ST program reflects the structure of the XML side of the transformation. In other words, the program acts as a template containing instructions interspersed with parts that appear literally in the XML document.

The "template" view is adopted not only for the result side, but also when XML is on the source side. The XML document is always processed (i.e., generated or parsed) in a strictly linear fashion, without constructing a tree representation for it. The data structure, on the other hand, is viewed as a tree of "data nodes" that can be accessed in random order using "reference expressions." Reference expressions are inserted into the template to reflect the correspondences between data nodes and XML fragments.

Every ST template can be read as a data structure to XML document transformation and as an XML document to data structure transformation. All language constructs and literals have symmetric interpretations. Moreover, they are designed to be reversible, meaning transformations can be written which, when applied to their result, yield the original source again. However, reversibility is not enforced, but it is facilitated by the absence of asymmetric constructs, especially in the conditional elements, which can express not only implications but also equivalences.

Referring to FIG. 1, simple transformation processing may be used in enterprise application system 100. Enterprise application system 100 contains one or more servers 110 and 130. The servers 110 and 130 may be SAP Web Application Servers, Apache servers, or a Microsoft Internet Information Servers. On server 110, an SAP Web Application Server, is running an ABAP virtual machine 112, which runs one or more applications 114 that are written in the ABAP programming language. Also running on the server 110 is the ST virtual machine 116. The ST virtual machine 116 executes the compiled ST code that performs the transformation between the data structures of the application 114 and XML documents. Also running on the web application server is the HTTP services module 118 that is responsible for sending information to and receiving requests from remote machines. A second server 130 may be a server of any kind on which one or more applications 132 are running. These applications may be implemented in any language that can be run on the server 130.

The applications 114 and 132 running on the servers 110 and 130 may need to access information stored in a database 120. There are two types of information that may be stored in database 120: XML data 122 and non-XML data 124. The applications 114 and 132 may also communicate with one or more client devices 140. These client devices 140 may have one or more applications 142 running on them. The client devices 140 may also have another instance of the ST virtual machine (similar to ST virtual machine 132) running on it. The server 110 is connected to the various client devices 140 by way of a network 150.

There are at least three situations in the enterprise application system 100 where a transformation between application data structures and XML documents is necessary. The first is when an application 114 or 132 running on the servers 110 or 130 needs to access data from the database 120. The applications 114 and 132 cannot easily use the XML data 122 from the database 120 directly, so the applications 114 and 132 use the ST virtual machine 116 to translate the XML data 122 into data structures they can use. Similarly, the applications 114 and 132 may need to save or archive their data structures to the database 120. Saving an XML document is sometimes more convenient than saving the actual data structures. For example, it is advantageous to store data in XML format when XML schema evolution is anticipated, or when the structure of the data changes over time is anticipated. Schema evolution is much easier to handle with XML because it is very flexible. When schema evolution is anticipated, the applications 114 and 132 first use the ST virtual machine 116 to convert the application data structures to XML documents for storage and archiving.

The second situation in which transformation between application data structures and XML documents is necessary is when two applications 114 and 132 running on the same or physically separate servers 110 and 130 need to pass information between one another. Consider for example that application 114 is implemented using ABAP, while application 132 is implemented in Java. In this case, the two applications cannot simply pass their data structures between one another. Application 114 will not be able to comprehend the Java data structures from application 132, and application 132 will not be able to comprehend the ABAP data structures from application 114. The applications 114 and 132 need a common medium for communication that they can both understand, such as XML documents. Therefore, in order to send data structures between each other, the applications 114 and 132 will use the ST virtual machine 116 to convert their data structures to more easily understood XML documents once an XML schema for communication has been agreed upon.

A third situation in which transformation between application data structures and XML documents is necessary is when an application 114 running on the servers 110 and 130 need to communicate with an application 142 running on a client 140. Server 110 and client 140 may be running different operating systems, and they may have different applications installed. Data structures from the applications and operating system of the server 110 cannot be used by the different applications and operating system of the client 140, and vice versa. Full data structures are also more difficult to transfer over network 150 than text files. For this reason, the data structures that need to be communicated between the server 110 and the client 140 are transformed into more easily understood and transferred XML documents.

Figure 2:
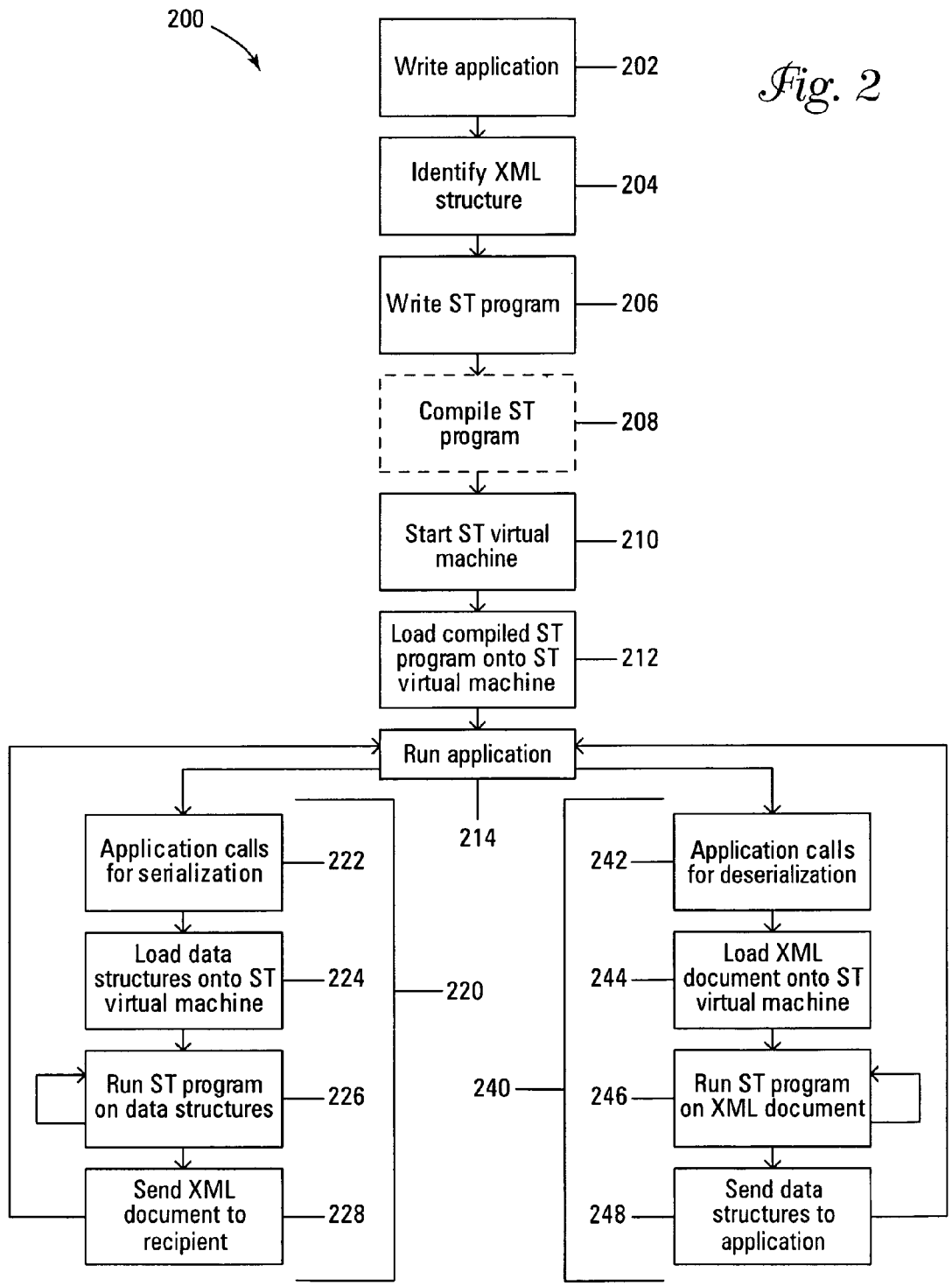
FIG. 2 is a flow chart of a process for executing the simple transformations language.

Referring to FIG. 2, a process 200 enables the transformation of data structures of application programs to XML documents, and vice versa, using the simple transformations language. Process 200 begins when an application is written (202). During the course of its operation, this application will produce XML documents for use by other applications and systems (i.e. serialization), or it will consume XML documents created by other applications and systems (i.e. deserialization).

Next, the structure of the XML side of the transformation must be identified (204). This structure can depend on structure of the application data structures or the XML documents to be transformed. The structure may take the form of an external XML schema, such as a business standard, or it may be defined by the application. Based on the transformations that will be necessary for serialization and deserialization and the identified XML structure, an ST program that will do the transformation between application data structures and XML documents is written (206). The same ST program that converts application data structures to an XML document may convert the same XML document back to application data structures, and vice versa. Thus, the design of the ST programming language allows the same ST program to perform symmetric transformations.

This ST program may be compiled into a byte-code language specifically designed for the ST language (208). The compiled program is run on a dedicated virtual machine for which the compiler optimizes the program. The program is compiled rather than just interpreted directly in order to save time spent analyzing and optimizing the program. Compilation optimizes the program before it runs, resulting in less to do at run-time. In addition, compilation only needs to occur once rather every time the specified transformation occurs, resulting in further efficiencies. Instead of compiling the ST program, it may be interpreted directly by a virtual machine capable of executing the actual ST language constructs.

Next, the ST virtual machine is started on the machine that will do the transformation (210). For example, the ST virtual machine 116 could be started on the server 110 from FIG. 1. The ST virtual machine 116 is capable of running a compiled ST program that is made up of instructions from the specially designed byte-code language. After starting the ST virtual machine (210), the compiled ST program is loaded on the ST virtual machine in anticipation of running it and performing the transformation specified therein (212).

At this point, the enterprise application (e.g. application 114) can be run (214). At some point in its execution, the application will call for the production or consumption of an XML document using the ST program that is waiting to be run on the ST virtual machine. The application will serialize its data structures to produce an XML document (branch 220) when it needs to send that information to another application or system. The application will deserialize a XML document into data structures (branch 240) when it is presented with an appropriate XML document by another application or system.

After a call for serialization of data structures occurs (222), the data structures from the application are loaded into the ST virtual machine 116 for transformation (224). Control of the application is given to the ST virtual machine 116, which runs the ST program to produce the appropriate XML document (226). While producing the XML document, the ST program may call for execution of another ST program. After the XML document is created, the XML document is given to the application, which sends it to its intended recipient, which may be another application or the database 120 (228). Control returns to the application, and execution continues (212).

Similarly, after a call for deserialization of an XML document (242), the XML document that the application retrieved for deserialization is loaded into the ST virtual machine 116 for transformation (244). Control of the application is given to the ST virtual machine 116, which runs the ST program to produce the appropriate data structures for the application (246). While consuming the XML document, the ST program may call for another ST program to be run. After consumption of the XML has finished, the data structures are given to the application for use (248). Control returns to the application, and execution continues (212).

In both cases, further transformations can occur. For example, after transforming an XML document from another system into data structures, the application can modify those data structures and then call for their transformation back to an XML document. The application can then send the XML document back to the system from which the original XML document came. This cyclical process between XML documents and application data structures may continue indefinitely.

Referring to FIG. 3, an exemplary ST program 300 is capable of converting certain application data structures to an XML document and vice versa. Program 300 is compiled into byte-code for execution on a dedicated virtual machine capable of executing that byte-code, for example, the ST virtual machine 116.

Line 302 is a basic header that begins program 300. It defines two namespaces, the conventional tt and p1, to be used throughout the program 300. Lines 302 and 396 (end of code) form a wrapper around the contents of the program 300. Line 304 is a standard include command that includes another ST program. Lines 306 and 308 declare symbolic names, or roots, to which an application data structure may be bound during a transformation.

Lines 398 appearing throughout the ST program 300 are informational comments that are not compiled or executed by the ST virtual machine 116.

Lines 310 and 394 (near end of code) delimit the transformation template 400 that defines a data structure/XML transformation. The programming constructs contained between lines 310 and 394 are responsible for transforming application data structures to XML documents, and vice versa. Thus, a single template may contain constructs that provide for symmetric transformation (serialization and deserialization). The template content consists of elements in the tt namespace (i.e. <tt:instruction>) mixed with literal XML elements, attributes, and text.

Every content element has symmetric serialization and deserialization semantics. The main activity during serialization is production of XML content, such as elements, attributes, and text, while the main activity during deserialization is the consumption of XML content. In contrast to production, consumption may fail because the XML source does not have the expected structure. The process of controlled consumption of the XML document is called matching, and the event of a code fragment not being matched in the stream is called a matching failure.

In an application program, data structures can be viewed as a tree with partially named, partially ordered nodes and valued leaves. The tree has a single named root that is used to access the tree and the data structures it contains. A node in the tree with a structured type has unordered children nodes resulting from the components of the data structure, uniquely named by the component names. A node in the tree with an atomic type as its value is a leaf. This structure creates a tree of data structures used within the application.

References can be made to data nodes in the tree of data structures using the tt:ref element, or the ref attributes of other commands or literal elements. The name specified by the required name attribute of the ref commands points to a node in the tree of data structures. During serialization, XML elements are created based on information contained at the node, and during deserialization, the node is assigned a value based on the XML element being consumed. Line 316 contains an example reference to a node R1.C1 in the tree of data structures.

The tt:value element (also forming part of line 316) copies a value from a source to a result. Typically it contains a reference as one of its attributes. During serialization, the value of the referenced node is written to the XML document. During deserialization, the matching value from the XML document is assigned to the referenced node. Data values in the tree of data structures can be of all basic types of the application programming language, such as strings or numbers, and the XML values can be strings that represent these values in a way that depends on the type. Line 316 will write the value of node R1.C1 to the XML document during serialization, and it will write the matching value from the XML document during deserialization.

Literal XML elements and attributes that are not constructs of the ST programming language may appear within the transformation template 400. During serialization, this literal XML content is simply written to the XML document. During deserialization, the literal XML elements are matched with the XML input. Lines 312, 314, 318, and 392 are examples of literal XML content appearing within the transformation template 400.

In addition to literal elements and attributes, literal text that is not a construct of the ST language can appear within the transformation template 400. This text can be free standing or surrounded by <tt:text> and </tt:text> tags. Like the literal elements and attributes, this text is written to the XML document during serialization and matched in the XML document during deserialization. Line 330 is an example of literal text appearing within the transformation template 400.

The tt:attribute command is used to specify an attribute name in the XML document. During deserialization, the value of the required name attribute of this command is written to the XML document, while during deserialization, the value of the name attribute is matched in the incoming XML document. Line 326 uses the tt:attribute command to specify or match an attribute in the associated XML document.

ST transformation templates 400 may also include namespace declarations. The tt:namespace command, along with its required name attribute, provide for namespace declarations. Let the value of the name attribute be called namespace-prefix. During serialization, a namespace declaration for namespace-prefix will be written to the XML document. The URI for the namespace is the one that is bound to namespace-prefix in the namespace declarations that are in scope at the instruction (i.e. in line 302). During deserialization, this command matches the binding of namespace-prefix to the corresponding URI in the stream.

All of the commands and transformation template 400 programming constructs described so far will be evaluated during both serialization and deserialization. Sometimes it is necessary to specify different behavior for serialization and deserialization. Directional constructs can encapsulate transformation template 400 content that is to be evaluated in only one direction. There are three such constructs. The template content between the tags <tt:serialize> and </tt:serialize> will only be evaluated during serialization. Likewise, the template content between the tags <tt:deserialize> and </tt:deserialize> will only be evaluated during deserialization. The tt:skip command causes certain elements of the incoming XML document to be skipped during deserialization. There are two optional attributes of the tt:skip command. A name attribute specifies the name of the XML elements to be skipped, while a count attribute specifies the number of XML elements to be skipped. Line 350 shows an example of a command used to skip all elements in the incoming XML stream named "pi:x6."

The assert commands are another set of commands that may apply to only one of serialization and deserialization. For example, the command tt:s-assert is evaluated only during serialization and the command tt:d-assert is evaluated only during deserialization, while the generic command tt:assert is always evaluated. All assert commands have an attribute called srcref. During serialization, the applicable assert command checks that the current referenced node has the same value as the node referenced in the srcref attribute and terminates with error otherwise. During deserialization, the applicable commands assign the value of the node referenced in the srcref attribute to the currently referenced node.

The transformation template 400 may also contain commands to copy sub-trees of data structures from XML elements to a location in the tree of data structures specified by the optional ref attribute. During serialization, the tt: copy command copies the sub-tree of application data structures rooted at the currently referenced node to the outgoing XML stream. During deserialization, the tt:copy commnand copies the XML sub-tree rooted at the current incoming stream position to the currently referenced node. Line 346 contains a copy command to and from the sub-tree of data structures rooted at R2.C3.

The tt:apply command applies a template to the current template. The command has a required name attribute that specifies the name of the template to be applied. The second template is specified outside the current template, possibly in an included program. The included template is evaluated at the point in the program at which the tt:apply command appears. Cyclic template application results in a static error, so recursion is not permitted.

An ST program can also call another ST transformation program from within a template using the tt:call command. The required transformation attribute specifies the name of an existing ST program to be run. The name cannot be the name of an included program. One or more tt:with-root commands, whose required name attributes specify the root of the tree of data structures to be used when running the program, may appear between the <tt:call> and </tt:call> elements. Lines 352 and 356 outline a tt:call command that contains a single tt:with-root declaration in line 354.

One distinguishing feature of the transformation programming language and ST programs is that they are actual programs with a control structure. They are not simply templates that are linearly applied. Certain elements that can appear with the transformation template 400 can alter the path of control followed through the template. For this reason, one template can be applied to many different incoming sets of data structures and XML documents. This greatly increases the expressive power of the ST language and the number of XML elements that can be produced and consumed by it.

One construct that can alter the control flow of the ST program is the looping construct, tt:loop. The tt:loop command specifies a concurrent loop over one or more collections of items, such as a table. Each tt:loop element contains one or more items declarations, tt:items, that refer to a distinct table in its ref attribute and specifies a distinct symbolic name for the lines of the table in its name attribute. After the items declarations comes the template content that is used to produce or consume XML content for each line of the table. A new line of the table is opened at the beginning of each iteration. During serialization, opening a line of the table means fetching the next line from the specified table. If no table line has been opened during an iteration, the loop terminates. During deserialization, opening a line of the table means creating a new line in the table. If matching fails at the beginning of an iteration, before any XML content has been matched, the loop terminates. Line 348 is an example of a loop over the lines of a table data structure.

Another element of an ST program that can alter the control flow of the overall program is the basic conditional, tt:cond. The basic conditional element supports conditional evaluation, depending on the value or existence of reference nodes during serialization, or on the matching of a pattern during deserialization. The conditional elements are intended to have a symmetric interpretation for both serialization and deserialization. This allows the conditional elements to express not just implications (i.e. "if . . . then . . . "), but rather equivalences (i.e. ". . . if and only if . . . ").

Patterns are specially formed pieces of template content. Conditional processing during deserialization requires template content that is immediately recognizable. Furthermore, the content must be skip-able (i.e. it must have a well defined end point). Such template content is called a pattern. Additionally, there is a special element allowed only inside conditional elements. <tt:empty/>. For serialization, this is equivalent to empty content, but its deserialization meaning is an explicit match for "no content at current position." A pattern has one of the following forms: literal XML elements, attribute elements, non-empty literal text, and the tt:empty element. A pattern is matched if the current stream token is the start of the element, the start of an XML element with the attribute, text beginning with the literal text, and the end of the current element's or attribute's content, respectively. A pattern is skipped by consuming the stream up to the end of the pattern without evaluating its children, if it has any.

Each tt:cond element has a data attribute. The value of a data attribute is a condition expression whose general form is a list of assertions followed by a logical clause. The data attribute is required for serialization. For serialization, the tt:cond element can optionally contain some template content that will be executed if all clauses of the condition expression evaluate to true. For deserialization, the template content of the tt:cond element must be a pattern. If the pattern is not matched in the incoming XML stream, there is no effect. If a reference node occurring in an assertion of the optional condition expression does not exist or does not satisfy a type test, two things may occur. If the template content is a pattern, the pattern is skipped and matching succeeds for the element. Otherwise, matching fails for the element. If none of these cases occur, then any template content in the element is evaluated, and all value assertions are established. If the check clause of the condition expression applies to deserialization and is false, matching fails for the element. Lines 358, 360, and 362 define a basic conditional element that will produce an x7 element if node R2.C7 in the tree of data structures has a value of 42 during serialization. It will also set the value of node R2.C7 to 42 if a matching x7 element is found in the incoming XML document.

Basic conditional elements can be combined to form composite conditional elements (within the template) that consist of one or more cases. A case is a basic conditional element or a directional variant. The constraint that there must be either a data condition or pattern content is lifted. In other words, a case may have no data condition and non-pattern template content at the same time. A serialization default is a basic conditional element without an assertion and without a check that applies to serialization, while a deserialization default is a basic conditional element without a pattern. All other cases are called proper serialization or deserialization cases.

There are two composite conditional elements: tt:switch and tt:group. In tt:switch, at most one case is selected for evaluation. In tt:group, each case is selected for evaluation at least once. In a tt:switch element, there may be at most one default case for each direction. During serialization, if there is one proper serialization case with a true condition expression, the first such case is evaluated. Otherwise, the serialization default, if it exists, is evaluated. During deserialization, if there is a proper deserialization case with a matching pattern, it is evaluated. Otherwise, the deserialization default is evaluated if it exists. If no case was evaluated, matching fails for that element. Lines 366 and 388 outline a composite conditional switch element that works with the contents of an x8 element.

In a tt:group element, there may be multiple default cases in both directions. During serialization, all proper serialization cases are evaluated in the given order, and then all default cases are evaluated. During deserialization, all cases are looped over until case selection fails or a selected case fails. Then deserialization cases are evaluated as they are in the tt:switch element. Matching fails for the group if a selected case fails or if a required case was not selected.

Using all of the elements described above, the ST program 300 will take a set of application data structures and produce an XML document during serialization, or it will consume an XML document to create a set of application data structures during deserialization. During execution of the program 300, the XML that is produced or consumed consists of a single element named x0 (line 312) with multiple children elements (e.g. x1, x2, and x3). Element x1 with literal text will always appear in the XML that is produced or consumed (lines 314, 316, and 318). Elements x2 and x3 will also in the produced or consumed XML document appear as children of element x0 (lines 320 and 322). Element x4 exists in the p1 namespace (line 324) and has attributes a41 (line 326) and p2:a42 (lines 328-334), as well as an empty child element x41 (line 336). The program loops over a table to create the element x5 (line 348), and it skips element x6 (line 350). Element x7 is conditionally included (lines 358-362), as are the contents of element x8 (lines 364-390).

The transformation programming language described herein has several advantages over other transformation languages, such as JiBX, which performs Java-XML data binding by augmenting Java class files. JiBX is a configuration language. It provides a fixed set of options, which strictly limits its expressive power. On the other hand, the ST programming language can handle constructs that JiBX cannot, such as conditional serialization based on expression evaluation, conditional deserialization based on XML pattern matching, multiplexing between data collections and XML elements, and mixed XML content containing both XML and text. These constructs can alter the control flow of the ST program, allowing it to do different things in different situations, which greatly increases the expressive power of the ST transformation language over that of simple configuration languages like JiBX. Furthermore, JiBX requires manipulation of the application code, while the ST programming language does not. Other data binding approaches for Java, such as JAXB, are even farther away from ST in their expressive power and non-intrusive character.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of implementations have been described. Nevertheless, it will be understood that various modifications may be made. Accordingly, other implementations are within the scope of the following claims.

What is claimed is:

1. A method for transforming application data structures into an XML document, the method comprising:
   writing an application program having Advanced Business Application Programming ("ABAP") data structures;
   writing a transformation program;
   executing the application program;

executing the transformation program when called for by the application program to transform the ABAP data structures from the application program into an XML document; and sending the XML document to a recipient.

2. The method of claim 1, wherein executing the transformation program further comprises executing the transformation program on a dedicated virtual machine.

3. The method of claim 2, wherein the virtual machine runs on a web application server.

4. The method of claim 1, wherein writing the transformation program further comprises compiling the transformation program into a byte-code language.

5. The method of claim 4, wherein executing the transformation program further comprises executing the compiled transformation program on a dedicated virtual machine.

6. The method of claim 1, wherein the transformation program is written in markup language syntax.

7. The method of claim 1, wherein the transformation program includes a construct for reading a value within the ABAP data structures and writing the value to the XML document.

8. The method of claim 1, wherein the transformation program allows for literal XML elements, attributes, and text that appear within the transformation program to be written to the XML document.

9. The method of claim 1, wherein the transformation program includes a construct for specifying attributes to be written to the XML document.

10. The method of claim 1, wherein the transformation program includes a construct for declaring namespaces in the XML document.

11. The method of claim 1, wherein the transformation program includes a construct for skipping program instructions.

12. The method of claim 1, wherein the transformation program includes a construct for copying elements from ABAP data structures to the XML document.

13. The method of claim 1, wherein the transformation program includes a construct for calling another transformation program.

14. The method of claim 1, wherein the transformation program includes a construct for applying a transformation template associated with another transformation program called by the application program.

15. The method of claim 1, wherein the transformation program includes a construct for looping over ABAP data structures while creating the XML document.

16. The method of claim 1, wherein the transformation program includes a construct for executing conditional logic to create certain XML content within the XML document.

17. The method of claim 1, wherein the transformation program used to convert the ABAP data structures into the XML document can be used to convert the XML document back into ABAP data structures.

18. A method for transforming an XML document into application data structures, the method comprising:

writing an application program configured to use Advanced Business Application Programming ("ABAP") data structures;

writing a transformation program;

executing the application program;

executing the transformation program when called for by the application program to transform an XML document into ABAP data structures for the application program; and using the ABAP data structures within the application program.

19. The method of claim 18, wherein executing the transformation program further comprises executing the transformation program on a dedicated virtual machine.

20. The method of claim 19, wherein the virtual machine runs on a web application server.

21. The method of claim 18, wherein writing the transformation program further comprises compiling the transformation program into a byte-code language.

22. The method of claim 21, wherein executing the transformation program further comprises running the compiled transformation program on a dedicated virtual machine.

23. The method of claim 18, wherein the transformation program is written in a markup language syntax.

24. The method of claim 18, wherein the transformation program includes a construct for reading a value within the XML document and writing the value to the ABAP data structures.

25. The method of claim 18, wherein the transformation program includes literal XML elements that are matched in the XML document.

26. The method of claim 18, wherein the transformation program includes a construct for matching the name of an attribute in the XML document.

27. The method of claim 18, wherein the transformation program includes a construct for matching a namespace declaration in the XML document.

28. The method of claim 18, wherein the transformation program includes a construct for skipping program instructions.

29. The method of claim 18, wherein the transformation program includes a construct for copying elements to the ABAP data structures from the XML document.

30. The method of claim 18, wherein the transformation program includes a construct for calling another transformation program.

31. The method of claim 18, wherein the transformation program includes a construct for applying a transformation template associated with another transformation program called by the application program.

32. The method of claim 18, wherein the transformation program includes a construct for looping over content from the XML document while creating the ABAP data structures.

33. The method of claim 18, wherein the transformation program includes a construct for executing conditional logic to create certain ABAP data structures.

34. The method of claim 18, wherein the transformation program used to convert the XML document into ABAP data structures can be used to convert the ABAP data structures back into the XML document.

35. An application system comprising:

a first process configured to execute an application program, wherein the application program is operable to use a set of Advanced Business Application Programming ("ABAP") data structures;

a second process configured to interpret a markup language document;

a transformation template configured to specify a symmetric mapping between the markup language document and the set of ABAP data structures;

a transformation virtual machine running in association with the first process and operable to execute the transformation template, wherein the transformation virtual machine is operable to:

perform a symmetric transformation between the markup language document and the set of ABAP data structures to allow the first process and the second process to exchange information; and provide the transformed data to the application program.

36. The application system of claim 35 wherein the first process is an ABAP virtual machine running on an application server.

37. The application system of claim 36 further comprising a database configured to communicate with the application server, wherein the database is operable to store at least one of XML data and non-XML data.

38. The application system of claim 36 wherein the application server is a web application server.

39. The application system of claim 35 wherein the second process is one of a client processor and a server processor configured to communicate with the application server.

40. A method for enabling application data structures to be used at multiple times by one or more application programs, the method comprising:

executing an application program, the application program using one or more Advanced Business Application Programming ("ABAP") data structures;

executing a transformation program when called for by the application program, the transformation program being configured to transform the one or more ABAP data structures into extensible markup language (XML) content, the XML content including one or more XML structures corresponding to the one or more ABAP data structures, and transform the XML structures of the XML content into the one or more ABAP data structures; and providing the transformed data structures to the application program.

41. The method of claim 40 further comprising storing the XML content in a data store from which the XML content may be later retrieved.

42. The method of claim 41 further comprising:
accessing the XML content from the data store;
executing the transformation program to transform the accessed XML content into the one or more ABAP data structures used by the application program; and
executing the application program using the one or more ABAP data structures.

43. The method of claim 40 further comprising transmitting the XML content to an external location for transformation into a second set of ABAP data structures to be used by a second application program through execution of a second transformation program that is configured to transform the transmitted XML content into the second set of ABAP data structures.

44. The method of claim 40 further comprising compiling the transformation program in preparation for the execution of the transformation program on a dedicated virtual machine.

45. A method for enabling application data structures to be used at multiple times by one or more application programs, the method comprising:

executing an application program, the application program using one or more Advanced Business Application Programming ("ABAP") data structures;

executing a transformation program when called for by the application program, the transformation program being configured to transform the one or more ABAP data structures into extensible markup language (XML) data, the XML data including one or more XML structures corresponding to the one or more ABAP data structures, and transform the XML structures of the XML data into the one or more ABAP data structures; and providing the transformed data structures to the application program.

46. The method of claim 45 further comprising storing the XML data in a data store from which the XML data may be later retrieved.

47. The method of claim 46 further comprising:
accessing the XML data from the data store;
executing the transformation program to transform the accessed XML data into the one or more ABAP data structures used by the application program; and
executing the application program using the one or more ABAP data structures.

48. The method of claim 45 further comprising transmitting the XML data to an external location for transformation into a second set of ABAP data structures to be used by a second application program through execution of a second transformation program that is configured to transform the transmitted XML data into the second set of ABAP data structures.

49. The method of claim 45 further comprising compiling the transformation program in preparation for the execution of the transformation program on a dedicated virtual machine.

50. A device for transforming application data structures into an XML document, the device comprising:

means for writing an application program having Advanced Business Application Programming ("ABAP") data structures;

means for writing a transformation program;

means for executing the application program;

means for executing the transformation program when called for by the application program to transform the ABAP data structures from the application program into an XML document; and means for sending the XML document to a recipient.

* * * * *